United States Patent
Mateer et al.

(10) Patent No.: US 9,065,904 B1
(45) Date of Patent: *Jun. 23, 2015

(54) METHOD AND APPARATUS OF PROVIDING DATA SERVICE MOBILITY

(71) Applicant: West Corporation, Omaha, NE (US)

(72) Inventors: Michael T. Mateer, Omaha, NE (US); James K. Boutcher, Omaha, NE (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/164,989

(22) Filed: Jan. 27, 2014

Related U.S. Application Data (63) Continuation of application No. 12/575,524, filed on Oct. 8, 2009, now Pat. No. 8,655,327.

(51) Int. Cl.
*H04M 3/42* (2006.01)
*H04W 4/20* (2009.01)
*H04W 4/12* (2009.01)
*H04W 4/06* (2009.01)

(52) U.S. Cl.
CPC . *H04M 3/42* (2013.01); *H04W 4/12* (2013.01); *H04W 4/06* (2013.01); *H04W 4/20* (2013.01)

(58) Field of Classification Search
CPC ........... H04W 4/06; H04W 4/16; H04W 4/20; H04W 4/12
USPC .......................... 455/422.1, 414.1, 412.1, 411
See application file for complete search history.

(56) References Cited

U.S. PATENT DOCUMENTS

| | | |
|---|---|---|
| 7,912,483 B2 | 3/2011 | Radic et al. |
| 2003/0212558 A1 | 11/2003 | Matula |
| 2005/0033808 A1 | 2/2005 | Cheng et al. |
| 2005/0191991 A1 | 9/2005 | Owen et al. |
| 2005/0197137 A1 | 9/2005 | Radic et al. |
| 2008/0020737 A1 | 1/2008 | Neil et al. |
| 2008/0081672 A1 | 4/2008 | Miyamoto |
| 2008/0268813 A1 * | 10/2008 | Maes ............................ 455/406 |
| 2009/0131022 A1 | 5/2009 | Buckley et al. |
| 2010/0244664 A1 * | 9/2010 | Fujioka et al. ................ 313/504 |

* cited by examiner

*Primary Examiner* — Khalid Shaheed (57) ABSTRACT

A method and apparatus of accessing a data service in a wireless communications network is disclosed. An example may include receiving a call identifying an application accessed by a mobile station, and verifying whether the accessed application is installed on the mobile station. The example may further include transferring a notification message to the mobile station based on the accessed application.

18 Claims, 9 Drawing Sheets

METHOD AND APPARATUS OF PROVIDING DATA SERVICE MOBILITY

CROSS-REFERENCE TO RELATED APPLICATIONS

This application is a continuation from U.S. patent application Ser. No. 12/575,524, filed Oct. 8, 2009, and entitled "METHOD AND APPARATUS OF PROVIDING DATA SERVICE MOBILITY", which is incorporated by reference herein in its entirety.

TECHNICAL FIELD OF THE INVENTION

This invention relates to a method and apparatus of providing data services to mobile stations. In particular, example embodiments may include operations associated with accessing data services from a mobile station.

BACKGROUND OF THE INVENTION

In recent years, mobile wireless data communication services have become increasingly popular. In particular, data services, such as, text messaging, short message service (SMS), multimedia services and other forms of data services continue to grow in popularity. In some instances, mobile data services are even favored over the traditional mobile voice services.

Figure 1:
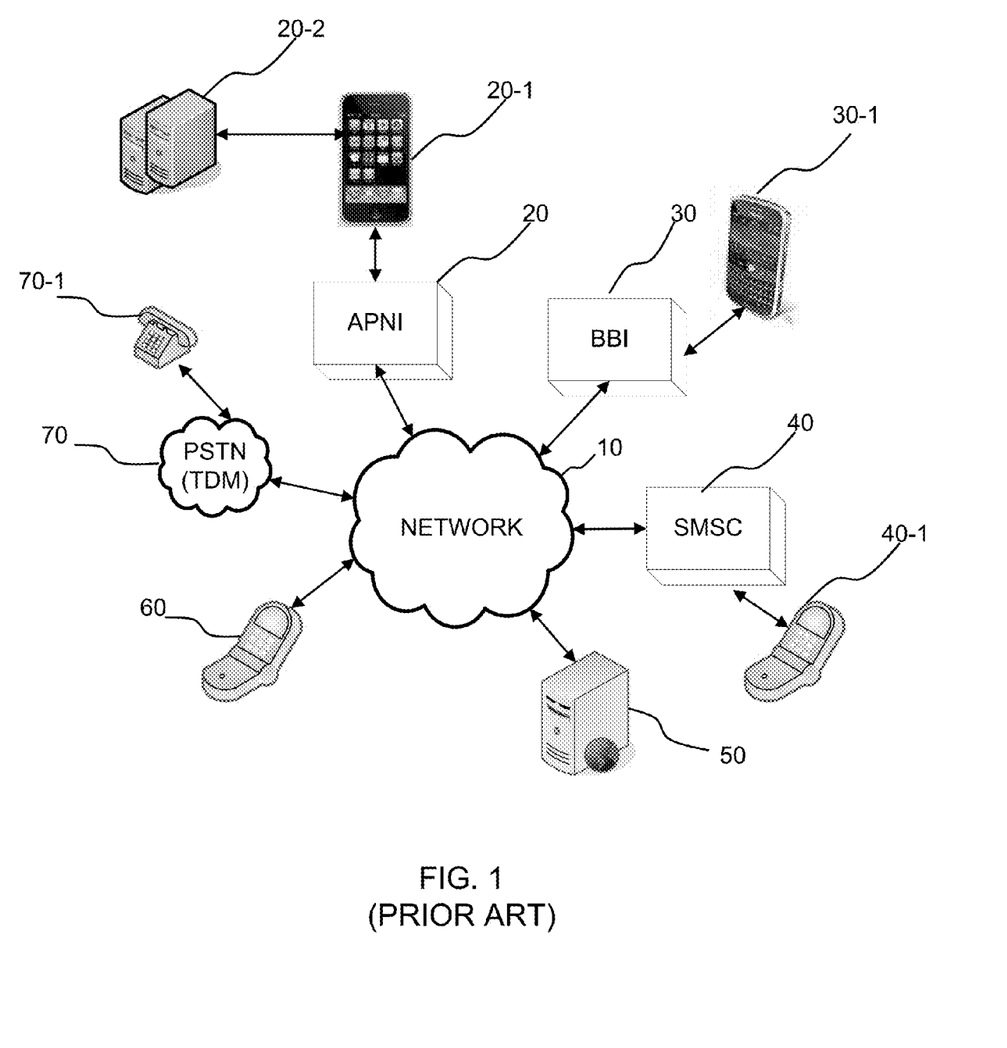
FIG. 1 illustrates an example of a conventional communication system.

FIG. 1 illustrates an example conventional mobile communications network 10. The network provides mobile voice and data communication services to various different mobile stations and corresponding mobile communication networking components. For example, an Apple® push notification interface unit (APNI) 20 provides data processing and forwarding services to an apple mobile station 20-1 (i.e., Iphone®). The mobile station 20-1 may also access an on device application via a web interface to an applet that communicates with an application server 20-1. Similarly, a Blackberry® interface unit (BBI) 30 provides data processing and forwarding services to a blackberry station 30-1 (i.e., Blackberry®).

Other conventional data services may include short messaging services (SMS) for transmitting and receiving data messages, multimedia messaging services (MMS) for transmitting and receiving multimedia files. Further conventional data services may include premium short message service (PSMS) as a type of payment scheme that permits operators to charge subscribers for mobile products and services. These above-noted types of services may be provided to a mobile station 40-1 by a short messaging service center (SMSC) 40. In addition, data web browsing may also be offered to users of a web browser terminal 50.

Conventional push-to-talk voice services may also be offered to a mobile station 60. Although, push-to-talk is in fact a voice service, the format of the voice data may be similar to a type of mobile data service. The communication network 10 may also provide access to telephony end users 70-1 over a public switched telephone network (PSTN) 70 that operates according to a time division multiplex (TDM) switching configuration.

The communication network 10 provides mobile voice and data services to all of the various different mobile stations and their respective data access schemes and protocols. The network 10 may represent one or more of the local loop telephony backbone network, the Internet and/or the network access providers of each of the respective mobile stations. These network access providers are experiencing increased demands for data services as opposed to voice services. Newer and more advanced methods of utilizing data services over the communication network 10 are continually being offered. These new data services are driving the increased usage of data services and a decrease in voice services. Furthermore, data services in general require less bandwidth and less real-time connectivity efforts, and, thus represent a more affordable service for the network providers.

SUMMARY OF THE INVENTION

One embodiment of the present invention may include a method of accessing a data service. The method may include receiving a call identifying an application accessed by a mobile station, and verifying whether the accessed application is installed on the mobile station. The method may further include transferring a notification message to the mobile station based on the accessed application.

Another example embodiment of the present invention may include an apparatus configured to access a data service. The apparatus includes a receiver configured to receive a call identifying an application accessed by a mobile station. The apparatus also includes a processor configured to verify whether the accessed application is installed on the mobile station. The apparatus further includes a transmitter configured to transfer a notification message to the mobile station based on the accessed application.

A further embodiment of the present invention also includes another method of accessing a data service. The method includes receiving a call identifying an application accessed by a mobile station. The method further includes determining that the accessed application requires an agent service, and determining route information based on the accessed application by using the agent service. The method also includes transferring a call information message comprising the route information to the mobile station.

A further embodiment of the present invention also includes another apparatus configured to access a data service. The apparatus includes a receiver configured to receive a call identifying an application accessed by a mobile station. The apparatus also includes a processor configured to determine that the accessed application requires an agent service, and, to determine route information based on the accessed application by using the agent service. The apparatus further includes a transmitter configured to transfer a call information message comprising the route information to the mobile station comprising.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Figure 2:
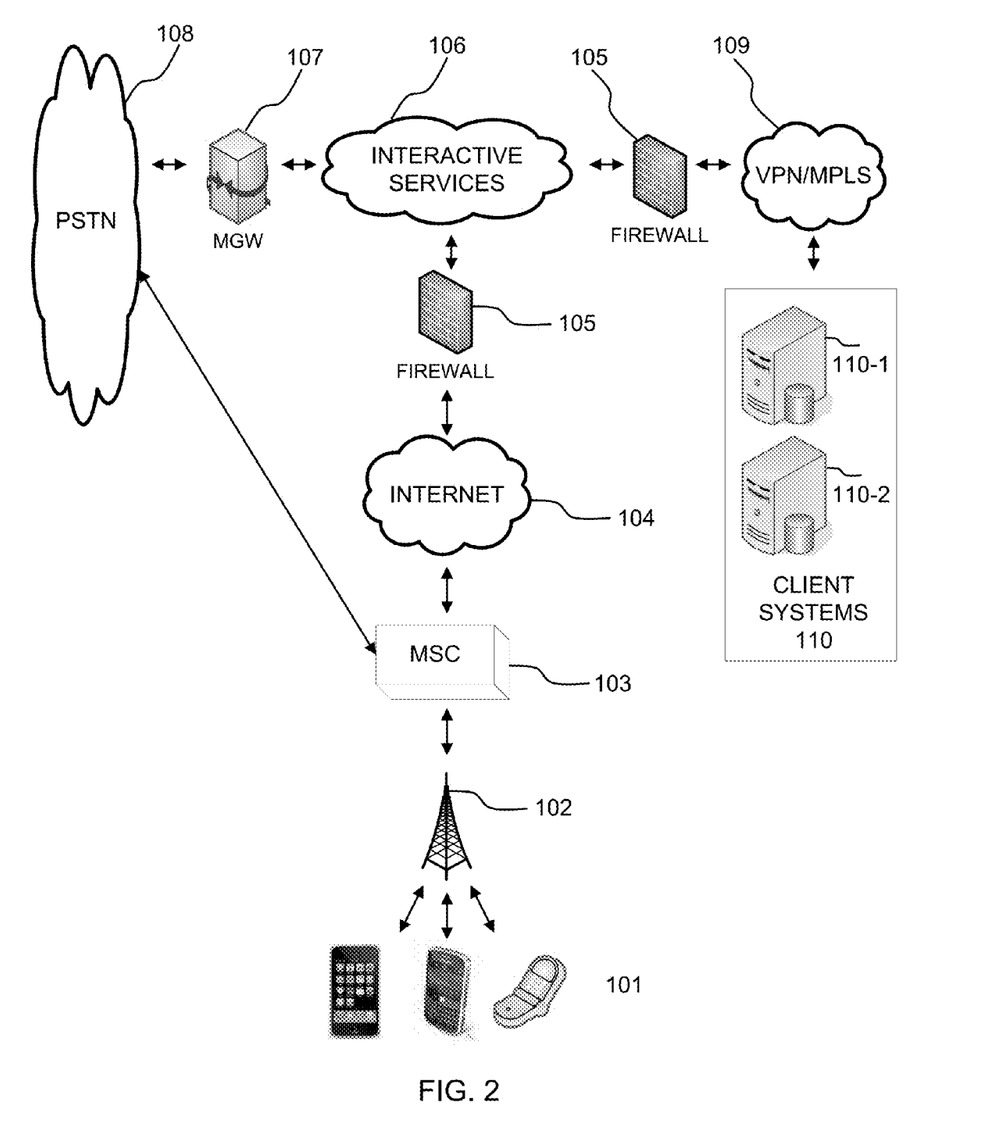
FIG. 2 illustrates an example network configuration according to an example embodiment of the present invention.

FIG. 2 illustrates an example integrated network configuration according to an example embodiment of the present invention. Referring to FIG. 2, one or more mobile stations 101 may communicate to the base station 102, which is further in communication with a mobile switching center (MSC) 103. The MSC 103 may communicate directly to the PSTN 108 to route voice data to an end user of the PSTN 108. Alternatively, the MSC 103 may connect to the Internet 104 to route a data request for an interactive service 106 and/or a data message.

Examples of interactive data and/or voice services, according to an example embodiment of the present invention, may include access to a remote secure data vault, platform voice self-service (VSS) and/or an interactive voice response (IVR) service, speech services, voice extensible mark-up language (XML), notifications, hosted contact centers, and/or hosted voice self-service (VSS) and/or an interactive voice response (IVR) service. These services may be accessed across a firewall 105 at a remote client system 110 that may include various different individual client systems 110-1 and 110-2.

In the event that a client system 110 is accessed to provide one or more of the interactive services 106, another firewall 105 may be accessed to enable access to a virtual private network (VPN) and/or a multiprotocol label switching (MPLS) mechanism.

MPLS is a type of telecommunications network protocol and/or routing procedure that directs and carries data from one network node to the next. MPLS creates virtual links between distant nodes on the network, and may encapsulate packets of various different network protocols. For example, when packets enter a MPLS-based network, label edge routers (LERs) (not shown) may provide a label or identifier. These labels contain information based on the routing table entry (i.e., destination, bandwidth, delay, and other metrics), and also refer to the layer-3 IP header field (source IP address), layer-4 socket number information, and/or other differentiated services.

In another example, the mobile stations may desire to access conventional voice services which may be accessed through the base station 102 and MSC 103. Once the MSC 103 receives a voice data request from a mobile station, the request may be routed to the PSTN 108 which may also represent the carrier or provider of the individual mobile station. The access request for voice services may then be forwarded to a media gateway 107 that is used to access the voice services and/or may be an outlet for the interactive data services 106.

FIG. 2 illustrates an example architecture according to an example embodiment of the present invention. However, more detailed examples are provided with reference to the other drawings.

Figure 3:
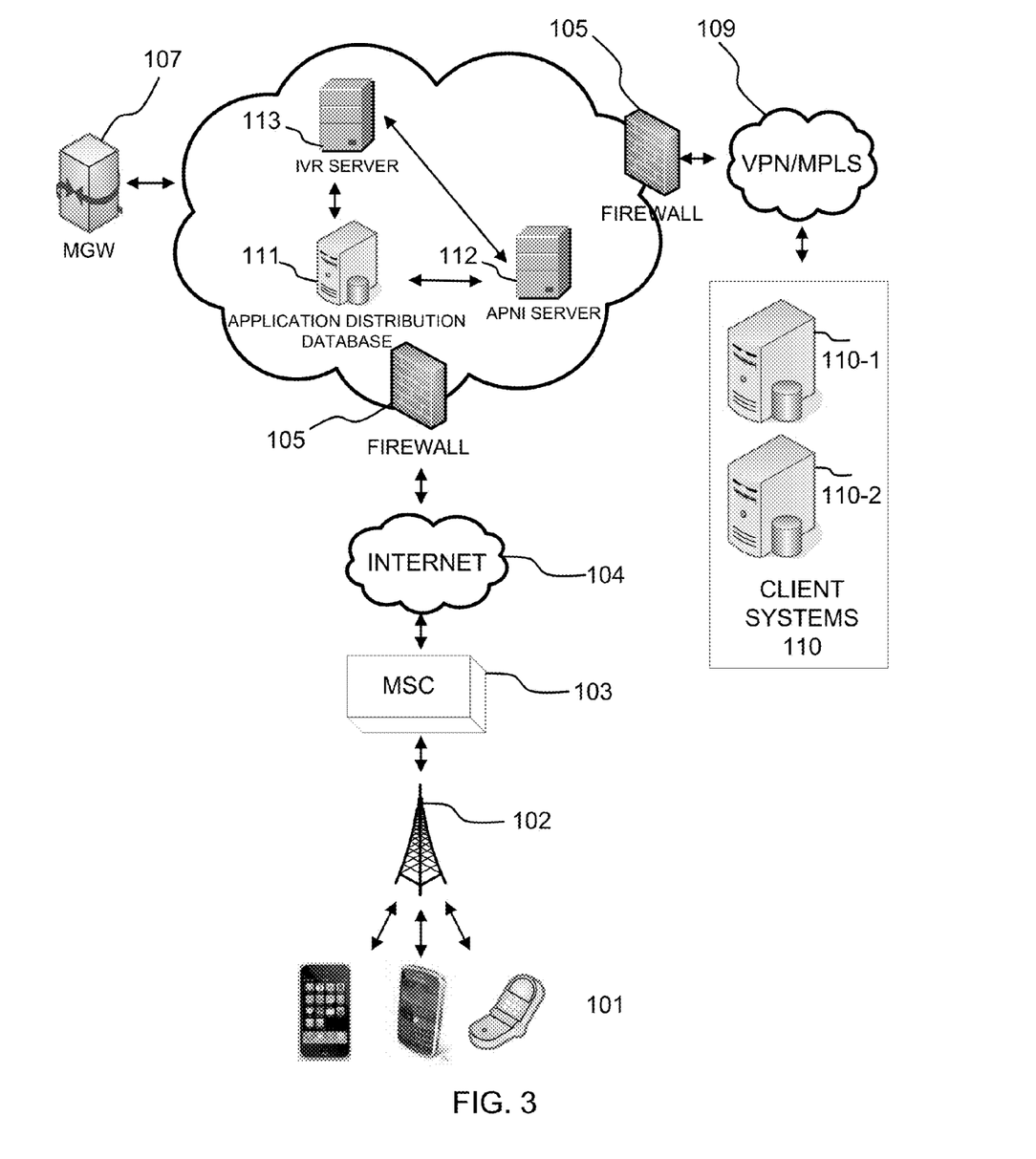
FIG. 3 illustrates another example network configuration according to an example embodiment of the present invention.

FIG. 3 illustrates a more detailed example of the types of operations included in an interactive data service access procedure, according to an example embodiment of the present invention. Referring to FIG. 3, a user of a mobile station 101 may desire to access a particular data application by initiating a data application or software program stored and executed on the mobile station 101. In operation, the user dials into the networking platform (i.e., network platform elements 111-113) by accessing one or more of the application distribution database 111, the APNI server 112 and the IVR server 113. The access operation is transferred to the base station 102 and the MSC 103 which may then be transferred directly to the media gateway 107 to access the networking platform and/or across the Internet 104 and firewall 105.

Once the networking platform receives the access message, the application distribution database 111 is accessed to determine whether the application itself has been properly installed on the user's mobile station 101. In the event the application is present and operational, a wakeup message is sent (i.e., pushed) to another networking component of the network and/or back to the mobile station 101.

In addition to the above-noted operations, the IVR server 113 may transfer a push notification message to the mobile station 101 by accessing the APNI server 112. In turn, the APNI server 112 will transfer the message across the firewall 105 to the Internet 104 towards the mobile communications network MSC 103 and the base station 102. Upon receiving the notification, the user may accept the notification, the application will execute, and a hang-up will be sent to the networking platform indicating a successful execution of the application.

Once the application has been executed, a communication path may be established between the mobile station 101 and the client systems 110 without the need to access the components of the networking platform. In other words, the mobile station 101 may access the client systems 110 directly by establishing a path across the firewalls 105 and the VPN/MPLS 109 to the client systems. Once the path has been established, the application may communicate to the client backend of the client systems by utilizing the necessary interfaces and web services. The user may then access the detailed information provided by the application. For example, depending on the application accessed by the user, the user may then access various services, check account balance information, order content (i.e., pay-per-view, etc.).

Figure 4:
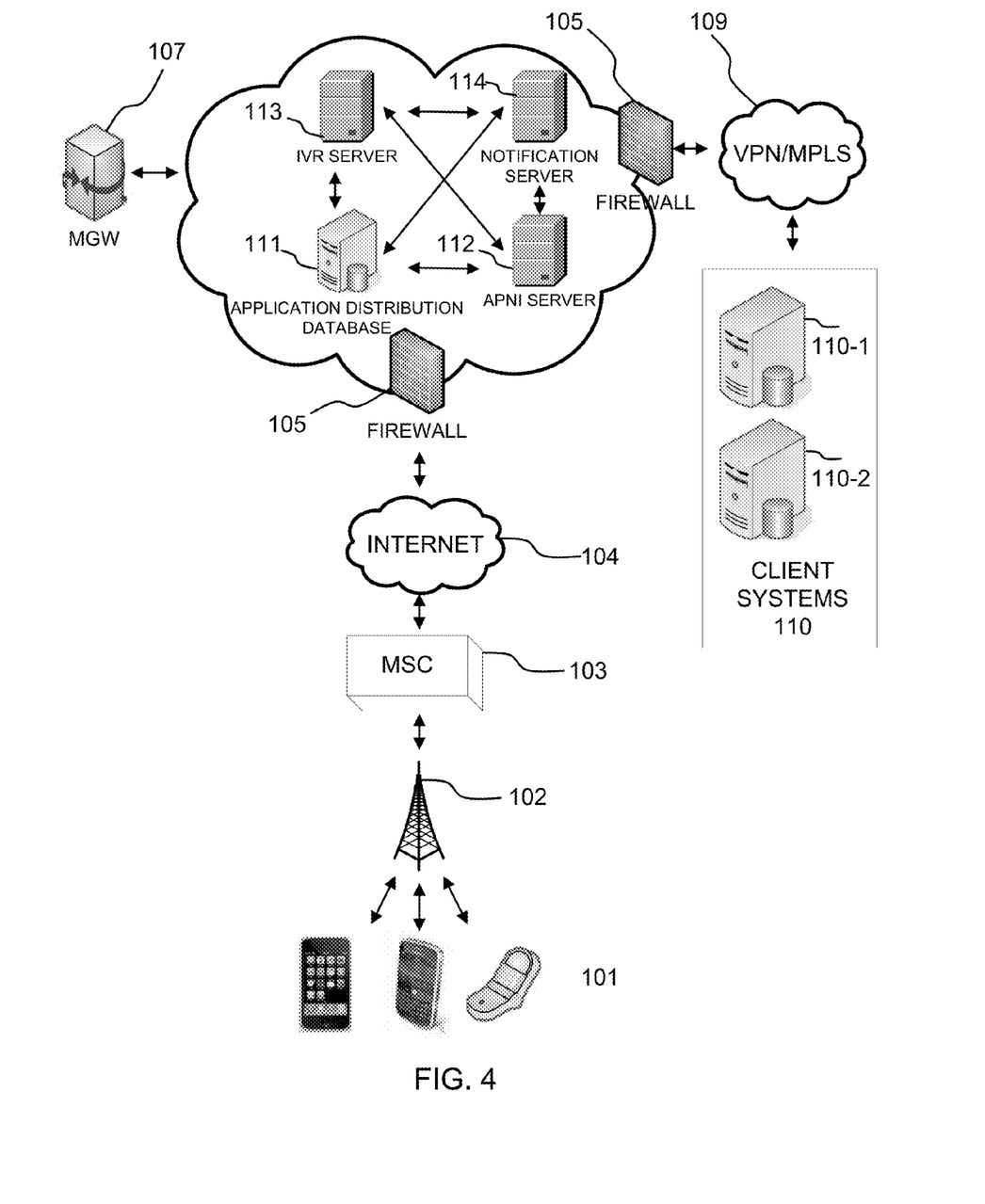
FIG. 4 illustrates yet another example network configuration according to an example embodiment of the present invention.

FIG. 4 illustrates another example embodiment of the present invention. Referring to FIG. 4, a user may desire to access a notification application that provides autonomous notifications to the user's mobile station 101. The user's application may be accessed on their respective mobile station 101. The application may interface with a schedule application programming interface (API) via an on-device application installed on the user's mobile station 101. The application may then access the base station 102, the MSC 103, the Internet 104, and the firewall 105 before accessing the client systems 110.

Once the application has accessed the client system 110, the client system may transfer the access message to a different component of the client system (i.e., from 110-1 to 110-2) in an effort to match the application's requested information with the appropriate client system. For example, the user may have accessed a notification application that provides the user with detailed notifications, such as, detailed appointment information regarding a scheduled appointment time when the user is scheduled to receive a delivery or a maintenance person is scheduled to arrive at the user's home.

The client system 110-2 may then provide the user requested notification information to the user. The notification information may be sent from the client system 110-2 to a notification server 114 of the networking platform. The application distribution database 111 may then be checked to determine if the user is currently registered to access such a notification application. Assuming that the user is properly registered in the database 111, the notification information may then be forwarded to the APNI server 112, which then transfers the notification information through the firewall 105, the Internet 104 and back towards the mobile networking platform of the MSC 103, the base station 102, and, to the mobile station 101. The user may then view the notification (i.e., "TV repair person will arrive at your address at 1 pm today"), and, may also modify or cancel the notification by selecting additional operations offered by the application.

Figure 5:
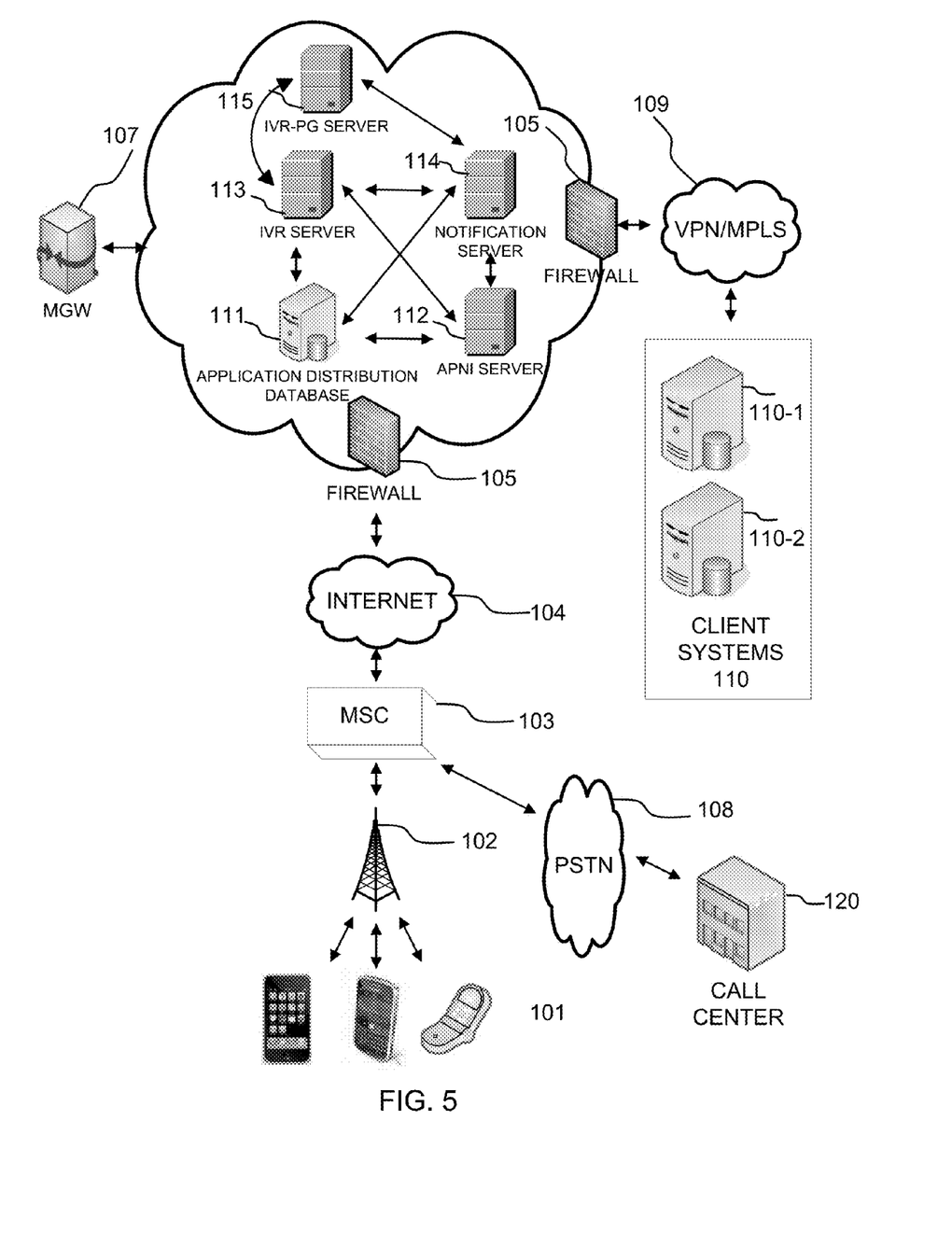
FIG. 5 illustrates still another example network configuration with an additional communication server according to an example embodiment of the present invention.

FIG. 5 illustrates another example embodiment according to the present invention. Referring to FIG. 5, an intelligent routing configuration is illustrated that includes similar components to those illustrated in FIGS. 3 and 4. However, in the network platform configuration of FIG. 5, an IVR peripheral gateway (IVR-PG) 115 and a call center 120 are included.

In one example, an IVR component of the IVR server 113 and/or the IVR-PG server 115 may be integrated into the network platform configuration and may affect the flow of a call. For example, an IVR server 113 that has a direct interface to an IVR-PG server 115 may provide certain services, such as, call routing, monitoring, and reporting. In addition to providing services, such as, a real-time agent and call event data processing agent, the IVR-PG server 115 may monitor the IVR server 113 for call and application data and control the movement of calls into and out of the IVR server 113. In other words, the IVR-PG server 115 may provide a call agent service.

Referring to FIG. 5, an example application accessed by a user of the mobile station 101 may provide transferring a message to an intelligent call router (ICR) platform provided by the IVR server 113 and/or the IVR-PG server 115. The user may then connect to an agent service provided by the IVR-PG server 115 in an effort to determine its route information for accessing the necessary application-related information. The route information may be determined by accessing the client system 110 and providing the information back to the user at the mobile station 101.

Once the route is determined, a call number (i.e., "8YY") or other route related information may be transferred back to the mobile station 101. The user may then dial the number directly to connect to the necessary application data. The user may push a single button and dial the received number. In one example, the call number may be a direct dial into a call center 120, which may be accessed via the PSTN 108. The user may then receive their personal information from the call center, such as, phone bill, personal options, etc.

Figure 6:
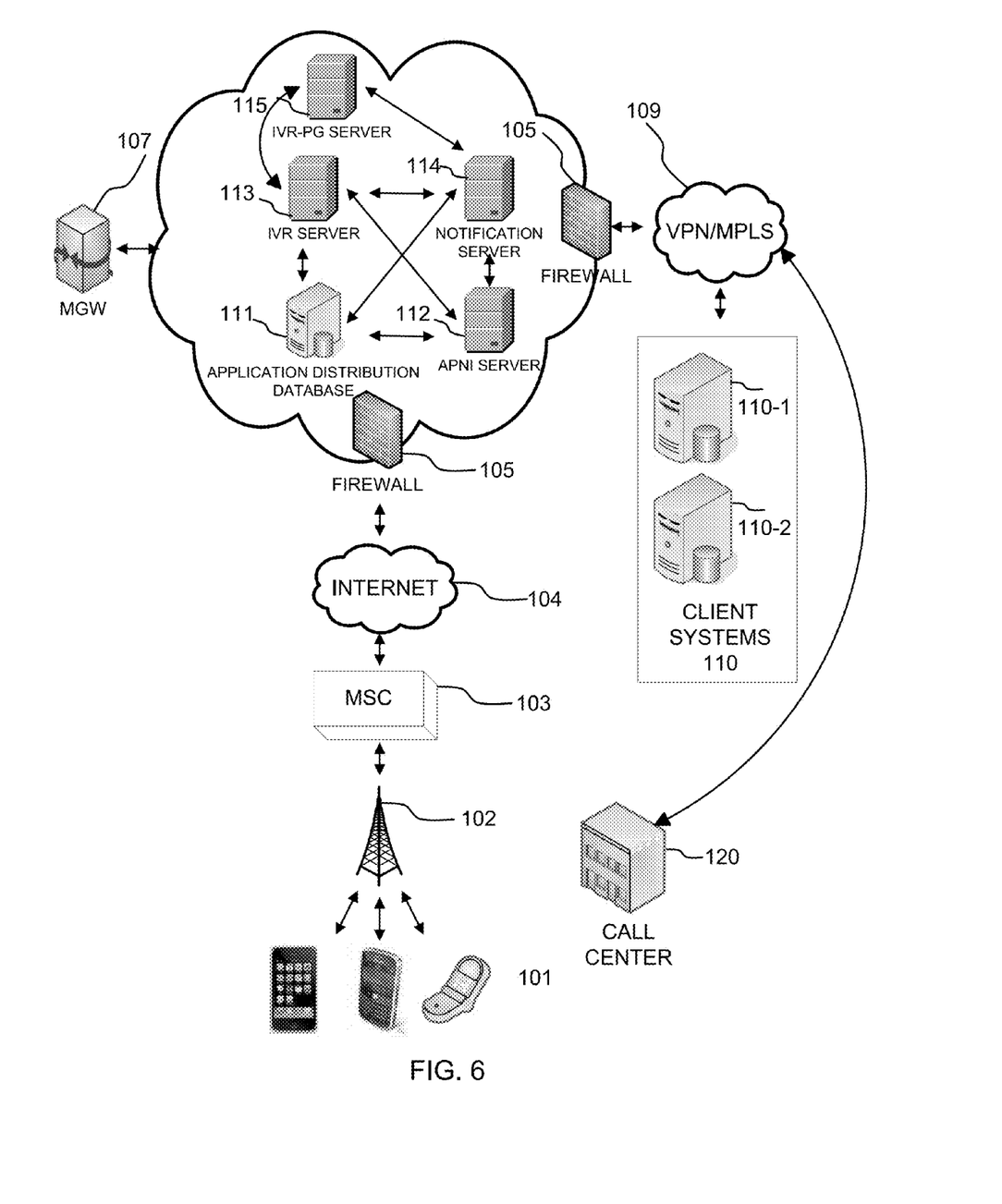
FIG. 6 illustrates still another example network configuration with an additional communication server and communication with the call center according to an example embodiment of the present invention.

FIG. 6 illustrates another example embodiment of the present invention. Referring to FIG. 6, instead of dialing the call center 120 directly via the PSTN 108 (as illustrated in FIG. 5), the user may bypass the PSTN 108 when accessing the call center 120. In this example, the call center 120 is accessed via an interface between the VPN/MPLS 108.

Referring to FIG. 6, the user of the mobile station 101 may transfer a message to an intelligent call router (ICR) platform provided by the IVR server 113 and/or the IVR-PG server 115. The user may then connect to an agent provided by the IVR-PG server 115 in an effort to determine its route information for accessing the necessary application-related information. The route information may be determined by accessing the client system 110 and providing the information back to the user at the mobile station 101.

Once the route is determined, a call number (i.e., "8YY") or other route related information may be transferred back to the mobile station 101. The user may then dial the number directly to connect to the necessary application data. The user may push a single button and dial the received number. However, instead of calling the call center 120 via the PSTN, the user's message may be instead routed through the MGW 107 to the IVR-PG server 115 which interfaces with the IVR server 113 for call association. The IVR server 113 may then dial the call number information itself without requiring the user to perform the dialing across the PSTN 108. The IVR server 113 and/or the IVR-PG server 115 may then connect to the call center via the VPN/MPLS 109 interface and retrieve the user's requested information and forward that information to the user of the mobile station 101. In this example, the call center 120 was accessed by a data message transfer procedure. Such an example procedure may be performed without requiring the user to initiate a voice data call.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 8 illustrates an example network element 800, which may represent any of the above-described network components 101, 102, 103, 107, 110-1, 110-2, and 111-115.

Figure 8:
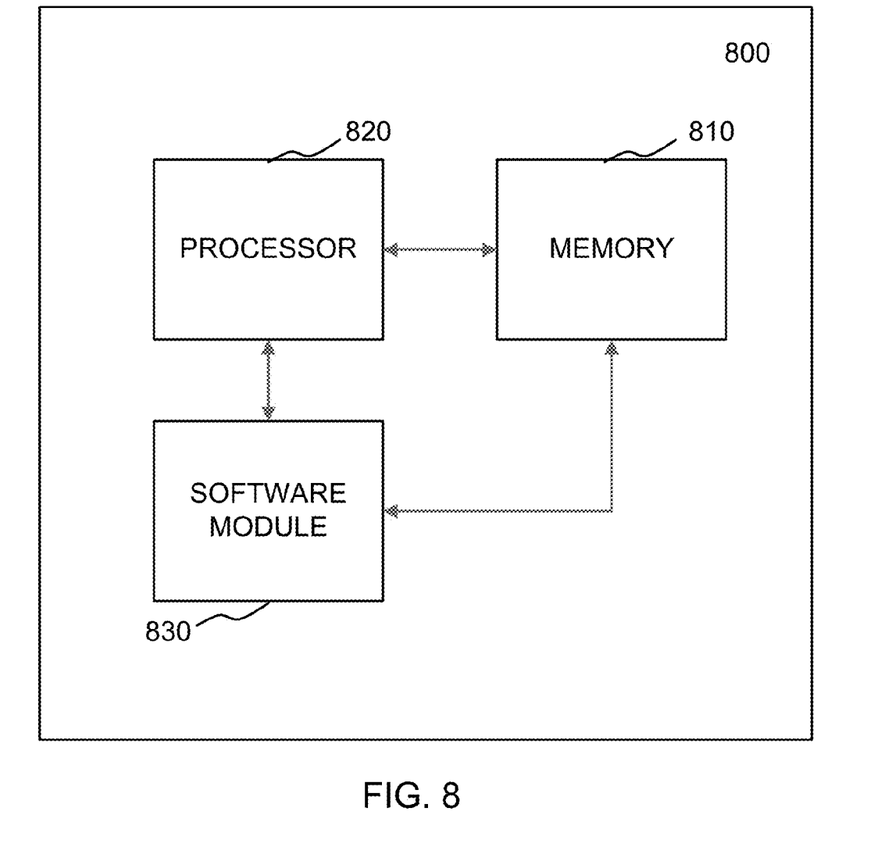
FIG. 8 illustrates an example apparatus that includes a computer readable medium according to an example embodiment of the present invention.

As illustrated in FIG. 8, a memory 810 and a processor 820 may be discrete components of the network entity 800 that are used to execute an application or set of operations. The application may be coded in software in a computer language understood by the processor 820, and stored in a computer readable medium, such as, the memory 810. Furthermore, a software module 830 may be another discrete entity that is part of the network entity 800, and which contains software instructions that may be executed by the processor 820. In addition to the above noted components of the network entity 800, the network entity 800 may also have a transmitter and receiver pair configured to receive and transmit communication signals (not shown).

Figure 7:
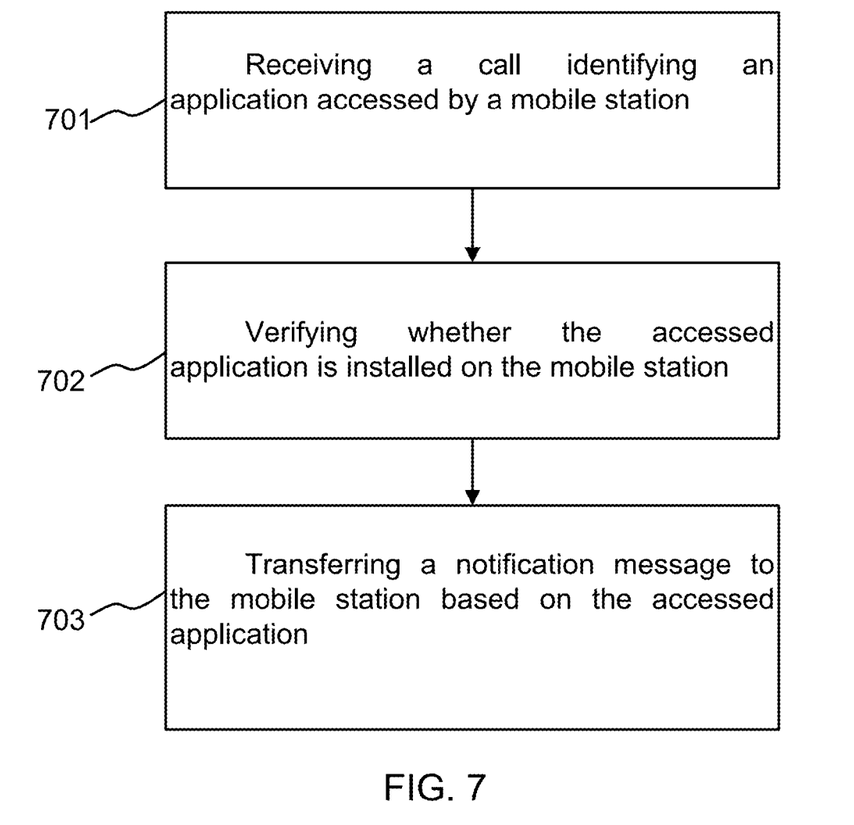
FIG. 7 illustrates an example method according to an example embodiment of the present invention.

One example embodiment of the present invention may include a method accessing a data service (see FIG. 7). The method may include receiving a call identifying an application accessed by a mobile station, at operation 701. The method may also include verifying whether the accessed application is installed on the mobile station, at operation 702. The method may further include transferring a notification message to the mobile station based on the accessed application, at operation 703.

Figure 9:
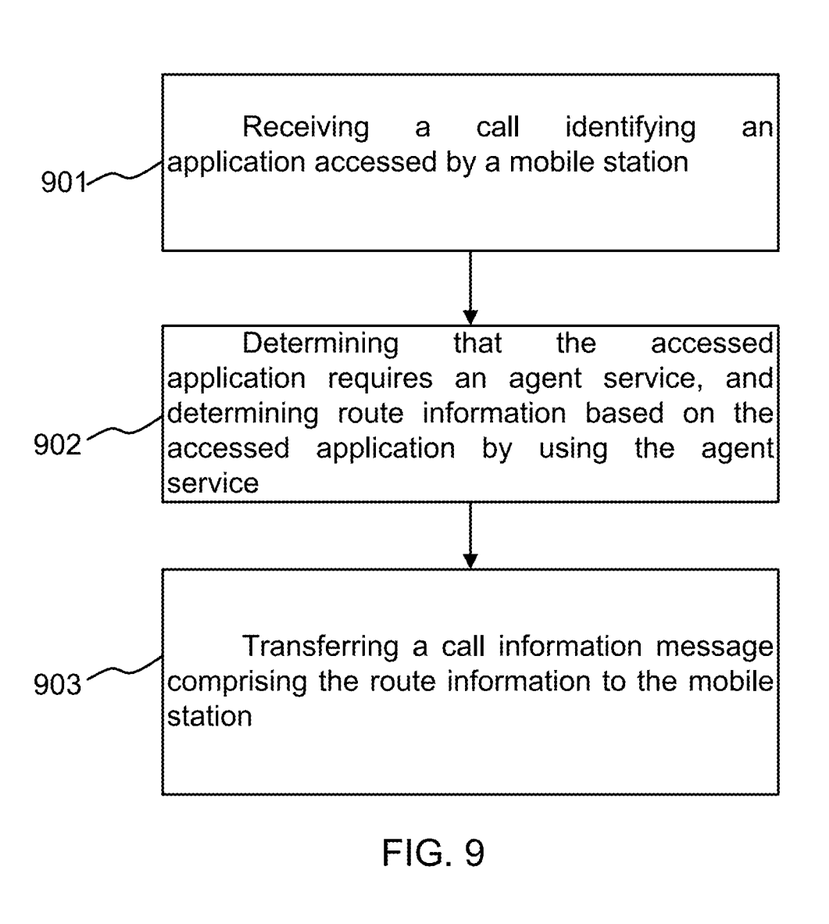
FIG. 9 illustrates another example method according to an example embodiment of the present invention.

Another example embodiment of the present invention may include another method of accessing a data service (see FIG. 9). The method may include receiving a call identifying an application accessed by a mobile station, at operation 901. The method may also include determining that the accessed application requires an agent service, and determining route information based on the accessed application by using the agent service, at operation 902. The method may further include transferring a call information message comprising the route information to the mobile station, at operation 903.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
   receiving a call, at a networking platform, identifying an application accessed by a mobile station;
   verifying, at the networking platform, whether the accessed application is installed on the mobile station;
   transferring, via the networking platform, a push notification message to the mobile station based on the accessed application;
   executing the application on the mobile station;
   responsive to executing the application, establishing a communication path between the mobile station and an agent service client; and
   accessing an interactive voice response (IVR) application that autonomously dials the call and receives application-related information and transfers the application-related information via the push notification message to the mobile station.

2. The method of claim 1, wherein the call and the notification message are data messages that do not include voice data.

3. The method of claim 1, wherein the verifying is performed by accessing a database.

4. The method of claim 1, wherein the agent service client includes at least one of a firewall and a virtual private network (VPN).

5. The method of claim 1, wherein after the notification message is transferred, a hang-up message is received indicating that the mobile station has accepted the notification.

6. An apparatus, comprising:
   a receiver configured to receive a call identifying an application accessed by a mobile station;
   a processor configured to
      verify whether the accessed application is installed on the mobile station;
      execute the application on the mobile station;
      responsive to the application being executed, establish a communication path between the mobile station and an agent service client; and
   access an interactive voice response (IVR) application that autonomously dials the call and receives application-related information;
   a transmitter configured to transfer a push notification message including the application-related information to the mobile station based on the accessed application.

7. The apparatus of claim 6, wherein the call and the notification message are data messages that do not include voice data.

8. The apparatus of claim 6, wherein the verification is performed by accessing a database.

9. The apparatus of claim 6, wherein the agent service client includes at least one of a firewall and a virtual private network (VPN).

10. The apparatus of claim 6, wherein after the notification message is transferred, a hang-up message is received indicating that the mobile station has accepted the notification.

11. A method, comprising:
   receiving, at a networking platform, a call identifying an application accessed by a mobile station;
   determining, at the networking platform, that the accessed application requires an agent service;
   transferring, via the networking platform, a message to an intelligent call router (ICR) platform, responsive to determining that the application requires an agent service;
   connecting to an agent service from the mobile station;
   determining route information based on the accessed application by using the agent service;
   transferring a call information message comprising the route information and a call number to the mobile station; and
   accessing an interactive voice response (IVR) application that autonomously dials the call number and receives application-related information and transfers the application-related information to the mobile station.

12. The method of claim 11, wherein the call information message provides the call number that may be dialed over a public switched telephone network (PSTN).

13. The method of claim 11, wherein the call information message comprises the call number that may be dialed over a data network.

14. The method of claim 13, wherein the data network is the Internet.

15. An apparatus, comprising:
   a receiver configured to receive a call identifying an application accessed by a mobile station;

a processor configured to
- determine that the accessed application requires an agent service, and, to determine route information and a call number based on the accessed application by using the agent service;
- transfer a message to an intelligent call router (ICR) platform, responsive to determining that the application requires an agent service;
- connect to an agent service from the mobile station; and
- access and interactive voice response (IVR) application that autonomously dials the call number, and wherein the receiver is further configured to receive application-related information, and wherein the transmitter is further configured to transfer the application-related information to the mobile station;

a transmitter configured to transfer a call information message comprising the route information to the mobile station.

16. The apparatus of claim 15, wherein the call information message provides a call number that may be dialed over a public switched telephone network (PSTN).

17. The apparatus of claim 15, wherein the call information message comprises the call number that may be dialed over a data network.

18. The apparatus of claim 17, wherein the data network is the Internet.

* * * * *